US006954048B2

(12) United States Patent
Cho

(10) Patent No.: US 6,954,048 B2
(45) Date of Patent: Oct. 11, 2005

(54) APPARATUS FOR MONITORING ELECTRIC MOTOR SCREW DRIVER SYSTEM

(75) Inventor: Yong Ki Cho, Chungcheongnam-do (KR)

(73) Assignee: Sehan Electools Ltd. (KR)

( * ) Notice: Subject to any disclaimer, the term of this patent is extended or adjusted under 35 U.S.C. 154(b) by 0 days.

(21) Appl. No.: 10/632,586

(22) Filed: Jul. 31, 2003

(65) Prior Publication Data

US 2004/0189232 A1 Sep. 30, 2004

(30) Foreign Application Priority Data

Mar. 31, 2003 (KR) ................................ 10-2003-0020086

(51) Int. Cl.[7] ............................ H02P 1/04; H02P 3/00; B32P 21/00; B25B 23/14

(52) U.S. Cl. ...................... 318/484; 318/264; 318/272; 388/937; 29/707; 29/713; 73/862.21

(58) Field of Search .......................... 29/709, 705, 702, 29/703, 240, 807, 706, 707, 708, 256–266, 712, 714, 713; 73/761, 862.21, 862.23, 862.24, 862.06, 862.193; 81/52, 429, 467, 469; 7/108, 165; 318/434, 484; 388/937

(56) References Cited

U.S. PATENT DOCUMENTS

| | | | | | |
|---|---|---|---|---|---|
| 3,962,910 | A | * | 6/1976 | Spyridakis et al. | 73/761 |
| 4,283,830 | A | * | 8/1981 | Gallizio et al. | 29/407.03 |
| 4,571,696 | A | * | 2/1986 | Bitzer | 700/253 |
| 4,620,450 | A | * | 11/1986 | Yamaguchi | 73/862.23 |
| 5,003,297 | A | * | 3/1991 | Hirabayashi | 340/680 |
| 5,061,885 | A | * | 10/1991 | Fukuhara | 318/434 |
| 5,245,747 | A | * | 9/1993 | Hansson | 29/703 |
| 5,937,370 | A | | 8/1999 | Lysaght | |
| 6,055,484 | A | | 4/2000 | Lysaght | |
| 6,349,266 | B1 | | 2/2002 | Lysaght et al. | |
| 6,479,958 | B1 | * | 11/2002 | Thompson et al. | 318/430 |
| 6,536,536 | B1 | * | 3/2003 | Gass et al. | 173/2 |
| 6,598,684 | B2 | * | 7/2003 | Watanabe | 173/2 |
| 6,687,567 | B2 | * | 2/2004 | Watanabe | 700/168 |
| 2004/0179829 | A1 | * | 9/2004 | Phillips et al. | 388/804 |

* cited by examiner

*Primary Examiner*—Marlon T. Fletcher
*Assistant Examiner*—Patrick Miller
(74) *Attorney, Agent, or Firm*—Blakely, Sokoloff, Taylor & Zafman

(57) ABSTRACT

A driver monitor for a driver system. A driver monitor includes a driver monitoring unit for monitoring the fastening operation of the driver based on pre-determined fastening information. A rotation start signal and a rotation stop signal are used to determine whether the fastening operation is appropriately completed or not. An information signal is generated based on a result of monitoring. An operation processing unit outputs the result information signal from the driver monitoring unit to external peripheral apparatus and receives an operation information signal from the external peripheral apparatus in order to cooperate with the external peripheral apparatus. A display unit receives the information signal from the driver monitoring unit and displays the information signal.

17 Claims, 6 Drawing Sheets

APPARATUS FOR MONITORING ELECTRIC MOTOR SCREW DRIVER SYSTEM

FIELD OF THE INVENTION

The present invention relates to an electric motor screw driver system; and, more particularly, to an apparatus for monitoring fastening operation of the electric motor screw driver system in order to increase efficiency of assembling processes.

DESCRIPTION OF RELATED ARTS

It is well known that a conventional electric-motor screw driver performs to fasten various fasteners such as a screw, a bolt or nuts by controlling a rotary axis of the electric-motor screw driver in response to a torque of electric power used for rotating the rotary axis.

FIG. 1 is a diagram for illustrating a conventional electric-motor screw driver. Referring to FIG. 1, the conventional electric-motor screw driver includes a driver 100 and a controller 200. The driver 100 also includes a lever 110.

When the lever 110 is pushed, the driver 100 sends an activation signal, which is logical high, to the controller 200 and the controller 200 drives an electric motor equipped inside of the electric motor screw driver by responding to the activation signal.

By driving the electric motor, the rotary axis 120 is rotated. If an electric power for driving the electric motor reaches a predetermined torque, the driver 100 generates a pulse signal and sends the pulse signal to the controller 200 as a rotation stop signal. The controller 200 stops the electric motor by responding to the pulse signal in order to stop rotating the rotary axis 120.

Additionally, the controller 200 receives an alternative current A.C. and supplies a direct current D.C. to the driver 200.

As mentioned above, the conventional electric motor screw driver system has a function to stop rotating the rotary axis when an operation power reaches a predetermined torque. However, the conventional electric motor does not have any functions to monitor conditions of fastening operation such as the number of fasteners which are completely fastened or malfunctioning fastening operation.

SUMMARY OF THE INVENTION

It is, therefore, an object of the present invention to provide an electric motor screw driver system for monitoring a fastening operation in order to increase efficiency of assembling processes.

It is another object of the present invention to provide an apparatus for monitoring the fastening operation in order to verify completeness of fastening operation.

It is still anther object of the present invention to provide an electric motor screw driver system for generating information signal in order to cooperate with other peripheral apparatus such as convey belt.

In accordance with an aspect of the present invention, there is provided an electric motor screw driver system, comprising: a driver having a first signal generation unit for generating a rotation start signal representing operate a fastening operation of the driver and a second signal generation unit for generating a rotation stop signal denoting a stop of the fastening operation; a power controller for controlling to operates the fastening operation of the driver by supplying electric power to the driver in response to the rotation start signal and ceasing the supply of electric power to the driver in response to the rotation stop signal; a driver monitoring unit for monitoring the fastening operation of the driver based on pre-determined fastening information, the rotation start signal and the rotation stop signal in order to determine whether the fastening operation is appropriately completed or not, generates information signal based on a result of monitoring; and a display unit for receiving the information signal from the driver monitoring unit and displaying the information signal.

In accordance with an aspect of the present invention, there is also provided an electric motor screw driver system, comprising: a driver having a first signal generation unit for generating a rotation start signal representing operate a fastening operation of the driver and a second signal generation unit for generating a rotation stop signal denoting a stop of the fastening operation; a power controller for controlling to operates the fastening operation of the driver by supplying electric power to the driver in response to the rotation start signal and ceasing the supply of electric power to the driver in response to the rotation stop signal; a driver monitoring unit for monitoring the fastening operation of the driver based on pre-determined fastening information, the rotation start signal and the rotation stop signal in order to determine whether the fastening operation is appropriately completed or not, generates information signal based on a result of monitoring; an operation processing unit for outputting the result information signal from the driver monitoring unit to external peripheral apparatus and receiving operation information signal from the external peripheral apparatus in order to cooperate with the external peripheral apparatus; and a display unit for receiving the information signal from the driver monitoring unit and displaying the information signal.

In accordance with an aspect of the present invention, there is also provided a driver monitor in an electric motor screw driver system, where in the electric motor screw driver system including a driver having a first signal generation unit for generating a rotation start signal representing operate a fastening operation of the driver and a second signal generation unit for generating a rotation stop signal denoting a stop of the fastening operation and a power controller for controlling to operates the fastening operation of the driver by supplying electric power to the driver in response to the rotation start signal and ceasing the supply of electric power to the driver in response to the rotation stop signal, the driver monitor, comprising: a driver monitoring unit for monitoring the fastening operation of the driver based on pre-determined fastening information, the rotation start signal and the rotation stop signal in order to determine whether the fastening operation is appropriately completed or not, generates information signal based on a result of monitoring; an operation processing unit for outputting the result information signal from the driver monitoring unit to external peripheral apparatus and receiving operation information signal from the external peripheral apparatus in order to cooperate with the external peripheral apparatus; and a display unit for receiving the information signal from the driver monitoring unit and displaying the information signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 2:
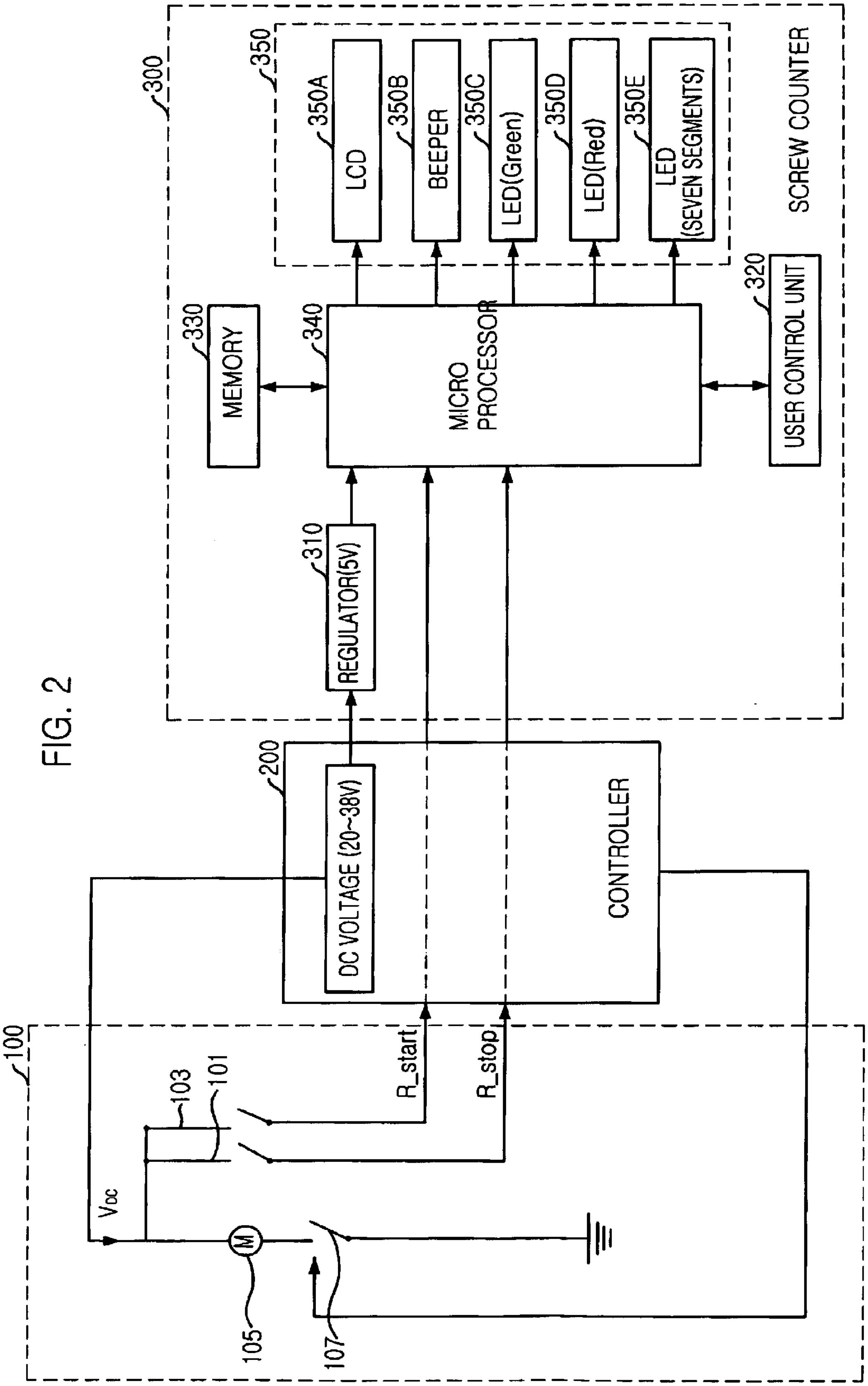
FIG. 2 is a diagram for illustrating an electric motor screw driver system in accordance with a preferred embodiment of the present invention.

FIG. 2 is a diagram for illustrating an electric motor screw driver system in accordance with a preferred embodiment of the present invention.

Referring to the FIG. 2, the electric motor screw driver includes a driver 100, a controller 200 for controlling operations of the driver 100, and a driver monitor 300 for verifying or determining whether a fastening operation of the driver is appropriately completed or not based on a rotation start signal and a rotation stop signal from the driver and outputting a result of determination by generating information signal.

Figure 1:
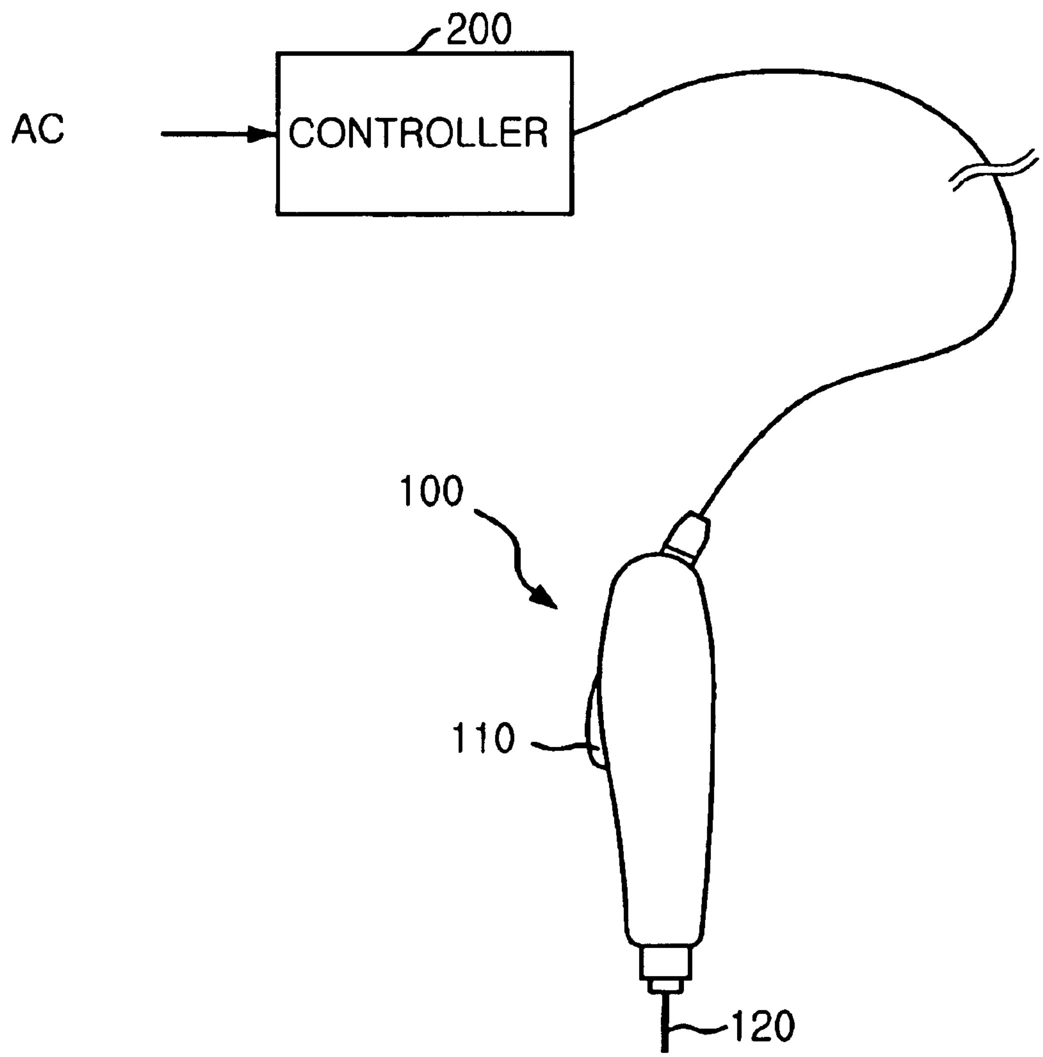
FIG. 1 is a diagram for illustrating a conventional electric-motor screw driver.
Figure 3:
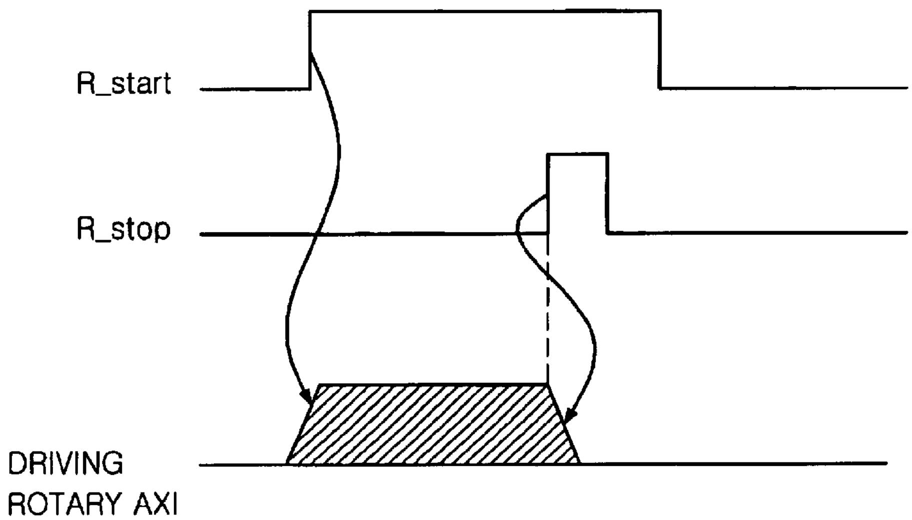
FIG. 3 is a graph shows a waveform of rotation start and rotation atop signals in accordance with a preferred embodiment of the present invention.

The driver 100 includes a first switching unit 103 for generating a rotation start signal in order to rotate a rotary axis of the driver 100 and a second switching unit 101 for generating a rotation stop signal in order to stop the rotary axis of the driver 100. According to the rotation start signal and rotation stop signal, a motor 105 is operated in order to rotate the rotary axis of the driver. FIG. 3 is a graph shows a waveform of rotation start and rotation stop signals. The rotation start signal and rotation stop signal are digital signals. The rotation start signal is continuously activated while the first switching unit is turned on. The first switching unit 103 is the lever 110 of FIG. 1. That is, while the lever 110 is pushed, the rotation start signal is generated and maintained as activated and the motor of the rotary axis in a driver is rotated. In a meantime, the rotation stop signal is a pulse signal, which is instantly activated at the moment that the second switching unit 101 is turned on. That is, the rotation stop signal is generated at the moment that electric power for driving the driver 100 is reached to a predetermined torque. That is, after the rotation start signal is activated and if the electric power for rotating the rotary axis of the driver 100 reaches a predetermined torque, the rotation stop signal is invoked. When the rotation stop signal is activated, the rotary axis of the driver 100 is stopped to rotate. Therefore, the rotary axis of the driver is rotated a time interval between the rotation start signal and the rotation stop signal.

The controller 200 receives the rotation start signal and the rotation stop signal from the first switching unit 103 and the second switching unit 101 of the driver 100. According to rotation start signals, the controller generates a fist control signal to turn on the motor 105 equipped inside of the driver 100 by turning on a motor switch 107 for supplying an electric power to the motor 105 to rotate the rotary axis. According to the rotation stop signals, the controller generates a second control signal to turn off the motor switch 107 in order to stop to supply electric power to the motor. Also the controller 200 passes the rotation start signal and the rotation stop signal to the driver monitor 300.

The driver monitor 300 is a core of the present invention. The driver monitor 300 analyzes the fastening operation of the driver according to the rotation start signal and the rotation stop signal and generates information signal based on a result of analysis. The driver monitor 300 receives the rotation start signal and rotation stop signal, and performs programmed tasks according to preprogrammed modes based on the received rotation start signal and the rotation stop signal. Mainly, the driver monitor 300 measures a fasten time for spending to fasten each fasteners such as screws, bolts or nuts, comparing the fasten time with predetermined target time range for verifying completeness of fastening operation and generating the information signal to perform programmed operations according to a result of comparison.

The driver monitor 300 includes a regulator 310, a user control unit 320, a memory 330, a microprocessor 340, and a display unit 350.

The regulator 310 generates an operating voltage 5V of internal circuit by down converting external voltage 20~38 V from the controller 200.

The user control unit 320 provides an interface to control the electric motor screw driver system to a user. Through the user control panel 320, the user can input information into the driver monitor for performing various tasks such as storing parameter values, setting modes, setting a predetermined target time range, inputting unit fastening times, inputting maximum or minimum unit fastening times, inputting the number of fasteners for one cycle of fastening operation, and resetting to an initial state.

The memory 330 stores predetermined values for fastening operations, a plurality of programmed modes, and additional information inputted from the user.

The microprocessor 340 receives the rotation start signal and rotation stop signal, analyzes the rotation start and rotation stop signals to measure the time interval between the rotation start signal and the rotation stop signal and generates information signal according to pre-programmed modes and the user's setting by using the information stored in the memory 330 such as the predetermined target time rage.

The display unit 350 receives information signal from the microprocessor 340 and displays a result of the analysis to corresponding sub displaying units. The display unit 350 includes a LCD unit 350A, a buzzer 350B, a green LED 350C, a red LED 350D and a segment LED 350E.

Hereinafter, operations of the driver monitor according to preprogrammed modes are explained in detail.

The driver monitor 300 performs necessary tasks according to pre-programmed modes such as a setting mode, an operation mode, a password setting mode, and a reset mode. Each of pre-programmed modes is selected by user through the user control unit 320.

At the setting mode, the driver monitor collects predetermined fastening information regarding to determinate whether the fastening operation is normally completed or not such as a mean time of unit fastening operation, the number of fasteners in a cycle of fastening operation, the predetermined target time range and a maximum unit fastening time or a minimum unit fastening time. At the setting mode, the screw drive computes a mean time of unit fastening operation by measuring real time for fastening a set of fasteners in one cycle of fastening operation and dividing total fastening operation times by the number of fasteners in a set. The computed mean time is stored at the memory as mean unit fastening operation time. It is such as threshold value to determine whether the fastening operation is normally completed. Other information is inputted and stored at the memory by user's input through the user control panel. That is, at the setting mode, a target object is tested to be subjected to the fastening operation to obtain the predetermined fastening information including the predetermined target time range.

At the operation mode, the driver monitor measures real time for fastening each fastener by receiving the rotation start signal and the rotation stop signal from the driver 100 and determine whether each fastening operation is appropriately completed or not based on the stored information such as the mean unit fastening operation time, the maximum unit fastening time and the minimum unit fastening time. That is, at the operation mode, the fastening operation of the driver is monitored by comparing a time interval between the rotation start signal and the rotation stop signal and the predetermined fastening information to thereby generating a completion signal representing a completion of fastening operation. How to determine completeness of fastening operation will be explained in later by referring to FIGS. 5A to 5D.

At the initial mode, the driver monitor is reset to initial mode and at the password setting mode, a security function is performed according to input of password.

In a meantime, the preprogrammed modes can be varied according to manufacture company design. In the above preferred embodiment of the present invention, 6 preprogrammed modes are provides as following table.

TABLE 1

| | Menu | Function | Remark |
|---|---|---|---|
| 1 | Product info | Product version | |
| 2 | Running mode | Work mode | |
| 3 | Pass word | Security by entering pass word | initial pw 0000 |
| 4 | parameter setting | program address, Min, Max, fastening time, Screw number | |
| 5 | Cycle start setting | Set the way of cycle starting | |
| 6 | Fastening time test | Measurement of screw fastening time, and check the average/Min/Max value | |
| 7 | Total count reset | Total fastened screw number reset | |

The preprogrammed modes are controlled and set by the user control panel.

Figure 4:
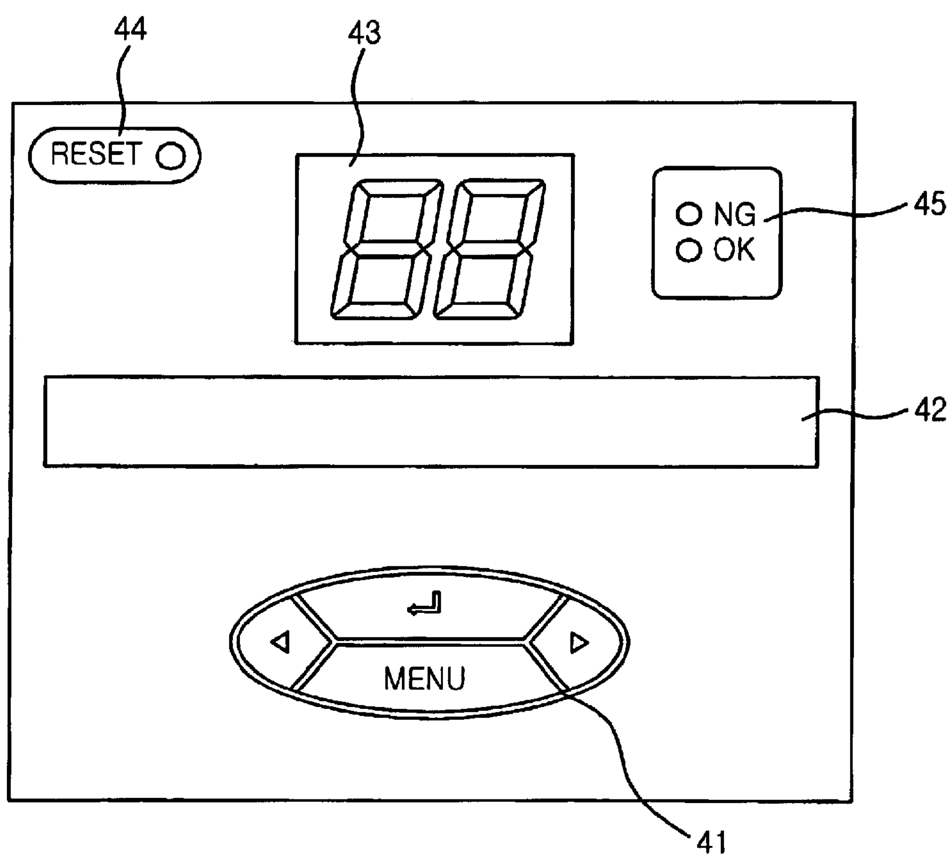
FIG. 4 shows a user control panel of a driver monitor in accordance with a preferred embodiment of the present intention.

FIG. 4 shows a user control panel of driver monitor in accordance with a preferred embodiment of the present invention.

Referring to FIG. 4, the panel of driver monitor includes a key pad unit 41 consisted of a menu key, an enter key, a left key and a right key, a LCD unit 42 for displaying state of fastening operation such as selected mode, fastening time, and judgment (READY, OK, ERROR), a LED number displayer 43 for displaying the number of remained fasteners to be fastened for each cycle of fastening operation, a reset unit 4 for resetting the number of fasteners for each cycle of fastening operation, and a determination LED unit for emitting a green LED or a red LED according a result of determination.

Hereinafter, a concept of how to verify completeness of fastening operation is explained by referring to FIGS. 5A to 5D.

FIGS. 5A to 5D are graph showing how to determine whether the fastening operation is normally or abnormally completed in accordance with a preferred embodiment of the present invention.

The rotation start signal is inputted to the driver monitor when the rotary axis is started to rotate. And the rotation stop signal is inputted to the driver monitor when the rotary axis is stopped to rotate. Therefore, the fastening time of each fastener can be measured by subtracting a time of receiving the rotation start signal from a time of receiving the rotation stop signal. That is, the time interval between the rotation stat signal R_Start and the rotation stop signal R_Stop is measured. For determining completeness of fastening operation, fastening times of fastening a set of fasteners used in a specific assembling process is measured at the setting mode (Fastening time test mode in Table.1) and a mean fastening time is computed by dividing the total fastening time of fastening a set of fasteners by the number fasteners in the set. Furthermore, a minimum unit fastening time FT_min and a maximum fastening time FT_max are computed by comparing measured fastening times of fasteners with the mean fastening unit time. Based on the minimum unit fastening time FT_min and the maximum fastening time FT_max, the predetermined target time range is computed.

Based on the computed information such as FT_min, FT_max, mean fastening time, the predetermined target time range, the time interval, the rotation stop signal and the rotation start signal, the completeness of fastening operation is verified. At the operation mode, the time interval for fastening the each fastener is measured. After measuring the time interval, the time interval is compared to the FT_min and the FT_max. If the time interval is longer than the FT_min and shorter than FT_max, then the fastening operation is appropriately completed. That is, if the time interval is in the predetermined target time range, the fastening operation is appropriately completed. In a contrary, if the time interval is shorter than the FT_min or longer than FT_max, then the fastening operation is not completely done. That is, if the time interval is not in the predetermined target time range, the fastening operation is not completely done.

Figure 5A:
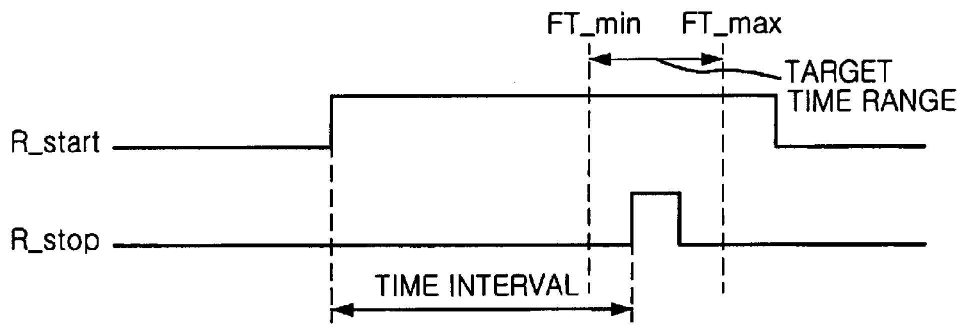
FIGS. 5A to 5D are graph showing how to determine whether the fastening operation is normally or abnormally completed in accordance with a preferred embodiment of the present invention.

FIG. 5A show a case of appropriately completed fastening operation. Referring to FIG. 5A, the rotation stop signal is generated in between a minimum unit fastening time FT_min and a maximum unit fastening time FT_max after the rotation start signal is activated. The time interval is in the predetermined target range. That is, it shows that the fastening operation is appropriately completed. In this case, the greed LED is emitted. Furthermore, a time for spending fastening operation, the number of fasteners in one cycle of fastening operation and OK message are displayed in the LCD unit.

Figure 5B:
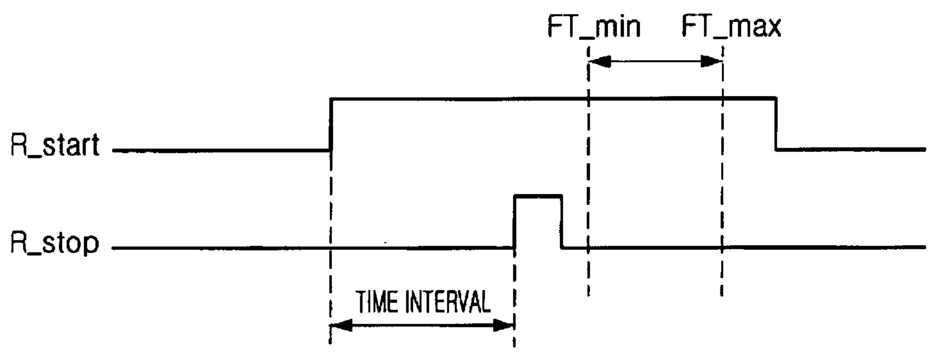

FIG. 5B shows a case of uncompleted fastening operation detected by short of fastening time of each fastener. The rotation stop signal is generated before the minimum fastening time (FT_min) after the rotation start signal is activated, The time interval is not in the predetermined target range. In this case, the red LED is emitted and a time for fastening operation and error message such as "not completed (short)" are displayed at the LCD unit 42.

Figure 5C:
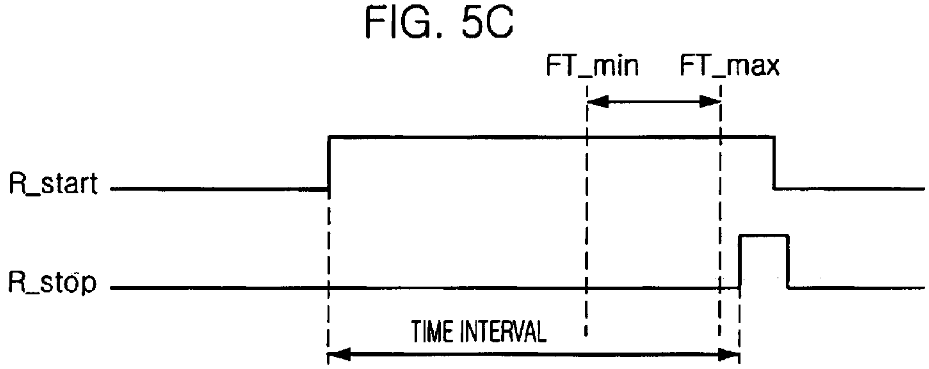

FIG. 5C shows another case of uncompleted fastening operation detected by exceed of fastening time. The rotation stop signal is generated after the maximum unit fastening time (FT_max) after rotation start signal is activated. The time interval is not in the predetermined target range. In this case, the red LED is emitted and a time for fastening operation and error message such as "not completed (exceed)" are displayed at the LCD unit 42.

Figure 5D:
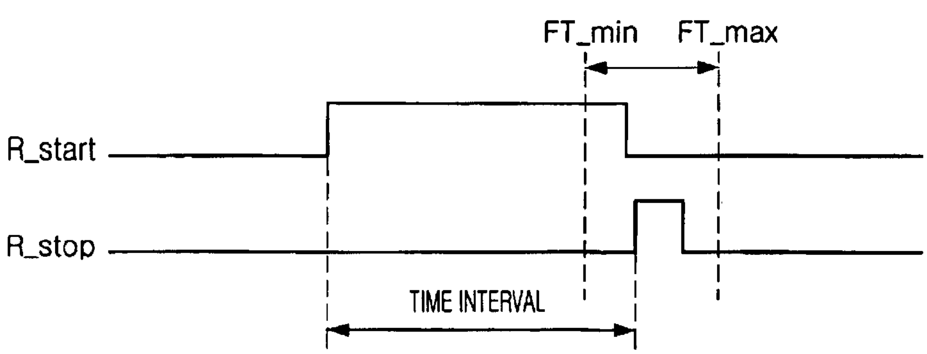

FIG. 5D shows further another case of uncompleted fastening operation when an electric power for fastening operation is not reached to predetermined torque. The rotation start signal is inactivated before the rotation stop signal is generated. The time interval is not in the predetermined target range. In this case, the red LED is emitted and the time for fastening operation, the number of the fasteners and an error message such as "No torque" are displayed on the LCD unit 42.

Figure 6:
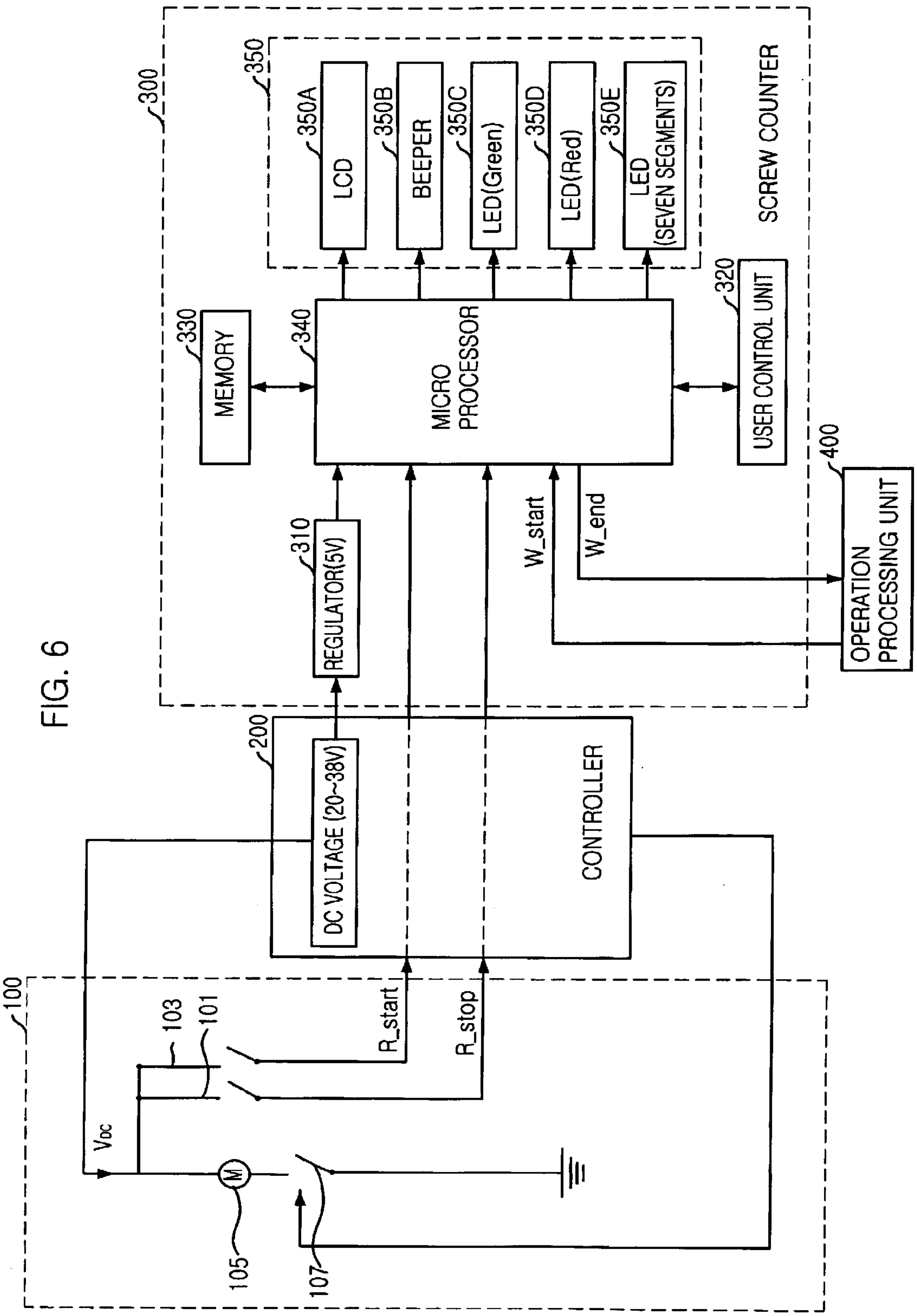
FIG. 6 is an electric motor screw driver system in accordance with another preferred embodiment of the present invention.

FIG. 6 is an electric motor screw driver system in accordance with another preferred embodiment of the present invention.

Referring to FIG. 6, the electric motor screw driver system in FIG. 6 is identical with an apparatus in FIG. 3 excepting an operation processing unit 400. Therefore, the other elements of the electric motor screw driver system in FIG. 6 are omitted excepting the operation processing unit 400.

The present invention can be cooperated with other peripheral apparatus such as a convey belt, a displayer or other electric motor driver system by generating and outputting a information signal regarding to the fastening operation analyzed based on the rotation start signal and rotation stop signal.

The operation processing unit receives the information signal from the microprocessor 340 in the driver monitor, analyzes necessary information contained in the information signal and generates operation order signal to other peripheral apparatus. After completing proper operation, the operation processing unit outputs a work done signal of the proper operation to the microprocessor 340 in the driver monitor.

For example, in case that the preferred embodiment of the present invention is connected to a convey belt the operation processing unit 400 generates operation start signal responding to the convey belt when new parts to be assembled is arrived and send operation start signal W_Start to the microprocessor 340 in the driver monitor. According to the operation start signal W_Start, the electric motor screw driver system performs normal assembling operation and the driver monitor determines whether each cycle of fastening operation is completed or not. After one cycle of fastening operation of driver is completed, the driver monitor sends an operation end signal W_end to the operation processing unit. In response to the operation end signal, the convey belt delivers new parts to be assembled. As mentioned above, the present invention can cooperate with other peripheral apparatus such as convey belt by generating and outputting information signal regarding to the fastening operation based on the rotation start and rotation stop signal and receiving an operation information signal from the other peripheral apparatus through the operation processing unit 400.

Figure 7:
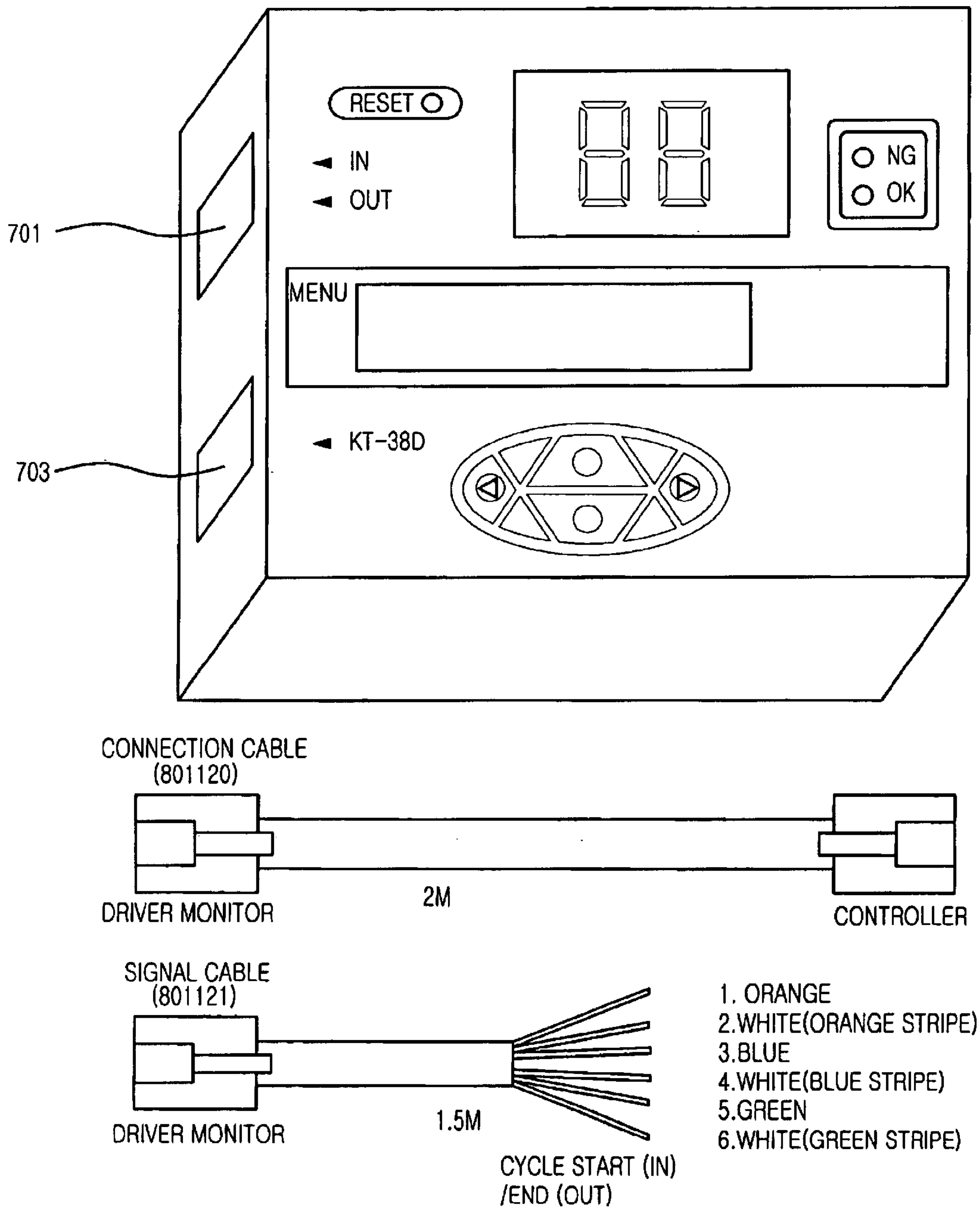
FIG. 7 shows a cable for communicating the electric motor screw driver system with an operation processing unit with a peripheral apparatus, and a driver monitor having ports for the cable.

FIG. 7 shows a cable for communicating the electric motor screw driver system with an operation processing unit with a peripheral apparatus, and a driver monitor having ports for the cable.

Referring to FIG. 7, the driver monitor includes an input/output port 701 and a connection port 703. By using the input/output port 701 connected to the operation processing unit 400, the driver monitor communicates with the peripheral apparatus through a signal cable.

In a meantime, the controller is provided as separate circuit board in the preferred embodiments explained above. However, the controller can be equipped inside circuit of the driver. Furthermore, a protocol between the electric motor screw driver system and other peripheral apparatus can be varied according to a manufacture design.

As mentioned above, the present invention can increase efficiency of assembling processes by providing an electric motor screw driver system monitoring fastening operation of each fastener.

Moreover, the present invention can verify proper completeness of fastening operation by measuring real time of fastening operation and comparing the measured time with predetermined minimum unit fastening time and maximum unit fastening time.

Furthermore, the present invention can automatically cooperate with other peripheral apparatus such as convey belt by generating and outputting information signal regarding to the fastening operation based on the rotation start and rotation stop signal, and receiving operation information signal generated and outputted from the other peripheral apparatus.

While the present invention has been described with respect to certain preferred embodiments, it will be apparent to those skilled in the art that various changes and modifications may be made without departing from the scope or the invention as defined in the following claims.

What is claimed is:

1. An electric motor screw driver system, comprising:

a driver having a first signal generation means for generating a rotation start signal representing to operate a fastening operation of the driver and a second signal generation means for generating a rotation stop signal denoting a stop of the fastening operation;

a power controller for controlling the fastening operation of the driver by supplying electric power to the driver in response to the rotation start signal and ceasing the supply of electric power to the driver in response to the rotation stop signal;

a driver monitoring means for monitoring the fastening operation of the driver based on predetermined fastening information, the rotation start signal and the rotation stop signal in order to determine whether the fastening operation is appropriately completed or not, to thereby generate an information signal based on a result of monitoring the fastening operation, wherein the driver monitoring means includes computation means for performing at least one test mode to determine a predetermined target time range included in the predetermined fastening information; and a display unit for receiving the information signal from the driver monitoring means to thereby display the information signal.

2. The system as recited in claim 1, wherein the driver monitoring means includes determination means for determining one appropriate and complete cycle of fastening operation based on a time interval between the rotation start signal and the rotation stop signal.

3. The system as recited in claim 2, wherein the determination means generates a completion signal representing the one appropriate and complete cycle when the rotation stop signal is activated between a minimum target time and a maximum target time of the predetermined target time range before the rotation start signal is inactivated.

4. The system as recited in claim 1, wherein the driver monitoring means further includes:

storage means for storing operation information of a plurality of modes and the predetermined fastening information for analyzing fastening operation of the driver; and a user control panel for generating a selection signal for selecting a mode among the plurality of modes;

wherein a selected mode is performed by the computation means based on the operation information.

5. The system as recited in claim 4, wherein the plurality of modes includes an operation mode for monitoring the fastening operation of the driver by comparing a time interval between the rotation start signal and the rotation stop signal and the predetermined fastening information to thereby generate a completion signal representing a completion of fastening operation.

6. The system as recited in claim 5, wherein the plurality of modes further includes:

a counting mode for setting a target number of fastening operations and counting the number of generated completion signals to generate a second completion signal when the number of generated completion signals is identical to the target number;

a setting mode for testing a target object to be subjected to the fastening operation to obtain the predetermined fastening information including the predetermined target time range; and an initial mode for initializing the predetermined fastening information in the storage means.

7. The system as recited in claim 6, wherein the setting mode includes:

a first setting mode for receiving a test rotation start signal and a test rotation stop signal for the target object from the driver;

a second setting mode for determining the target time range by using a time interval between the test rotation start signal and the test rotation stop signal; and a third setting mode for storing the target time range into the storage means.

8. An electric motor screw driver system, comprising:

a driver having a first signal generation means for generating a rotation start signal representing to operate a fastening operation of the driver and a second signal generation means for generating a rotation stop signal denoting a stop of the fastening operation;

a power controller for controlling the fastening operation of the driver by supplying electric power to the driver in response to the rotation start signal and ceasing the supply of electric power to the driver in response to the rotation stop signal;

a driver monitoring means for monitoring the fastening operation of the driver based on predetermined fastening information, the rotation start signal and the rotation stop signal in order to determine whether the fastening operation is appropriately completed or not, to thereby generate an information signal based on a result of monitoring the fastening operation, wherein the driver monitoring means includes computation means for performing at least one test mode to determine a predetermined target time range included in the predetermined fastening information;

an operation processing unit for outputting the information signal from the driver monitoring means to an external peripheral apparatus and for receiving an operation information signal from the external peripheral apparatus in order to cooperate with the external peripheral apparatus; and a display unit for receiving the information signal from the driver monitoring means to thereby display the information signal.

9. The system as recited in claim 8, wherein the peripheral apparatus includes a convey belt, an electric motor screw driver, a personal computer or a remote control terminal.

10. The system as recited in claim 8, wherein the driver monitoring means includes determination means for determining one appropriate and complete cycle of fastening operation based on a time interval between the rotation start signal and the rotation stop signal.

11. The system as recited in claim 8, wherein the determination means generates a completion signal representing the one appropriate and complete cycle when the rotation stop signal is activated between a minimum target time and a maximum target time of the predetermined target time range before the rotation start signal is inactivated.

12. The system as recited in claim 8, wherein the driver monitoring means further includes:

storage means for storing operation information of a plurality of modes and the predetermined fastening information for analyzing fastening operation of the driver; and a user control panel for generating a selection signal for selecting a mode among the plurality of modes;

wherein a selected mode is performed by the computation means based on the operation information.

13. The system as recited in claim 12, wherein the plurality of modes includes an operation mode for monitoring the fastening operation of the driver by comparing a time interval between the rotation start signal and the rotation stop signal with the predetermined fastening information to thereby generate a completion signal representing a completion of fastening operation.

14. A driver monitor in an electric motor screw driver system, wherein the electric motor screw driver system including a driver having a first signal generation means for generating a rotation start signal representing to operate a fastening operation of the driver and a second signal generation means for generating a rotation stop signal denoting a stop of the fastening operation and a power controller for controlling the fastening operation of the driver by supplying electric power to the driver in response to the rotation start signal and ceasing the supply of electric power to the driver in response to the rotation stop signal, the driver monitor, comprising:

a driver monitoring means for monitoring the fastening operation of the driver based on predetermined fastening information, the rotation start signal and the rotation stop signal in order to determine whether the fastening operation is appropriately completed or not, to thereby generate an information signal based on a result of monitoring the fastening operation, wherein the driver monitoring means includes computation means for performing at least one test mode to determine a predetermined target time range included in the predetermined fastening information;

an operation processing unit for outputting the result information signal from the driver monitoring means to external peripheral apparatus and receiving operation information signal from the external peripheral apparatus in order to cooperate with the external peripheral apparatus; and a display unit for receiving the information signal from the driver monitoring means to thereby display the information signal.

15. The driver monitor as recited in claim 14, wherein the driver monitoring means includes determination means for determining one appropriate and complete cycle of fastening operation based on a time interval between the rotation start signal and the rotation stop signal.

16. The driver monitor as recited in claim 15, wherein the determination means generates a completion signal representing the one appropriate and complete cycle when the rotation stop signal is activated between a minimum target time and a maximum target time of the predetermined target time range before the rotation start signal is inactivated.

17. The driver monitor as recited in claim 14, wherein the driver monitoring means further includes:

storage means for storing operation information of a plurality of modes and predetermined fastening information for analyzing fastening operation of the driver; and a user control panel for generating a selection signal for selecting a mode among the plurality of modes;

wherein a selected mode is performed by the computation means based on the operation information.

* * * * *

UNITED STATES PATENT AND TRADEMARK OFFICE

CERTIFICATE OF CORRECTION

PATENT NO. : 6,954,048 B2

APPLICATION NO. : 10/632586

DATED : October 11, 2005

INVENTOR(S) : Yong Ki Cho

It is certified that error appears in the above-identified patent and that said Letters Patent is hereby corrected as shown below:

In the Brief Description of the Drawings, Col. 3, Figure 3, line 2, please delete “atop” and insert -- stop --.

Signed and Sealed this

Eleventh Day of December, 2007

JON W. DUDAS

*Director of the United States Patent and Trademark Office*